US012677327B2

(12) United States Patent
Jung et al.

(10) Patent No.: US 12,677,327 B2
(45) Date of Patent: Jul. 7, 2026

(54) ELECTRONIC DEVICE COMMUNICATING WITH WEARABLE DEVICE AND CONTROLLING METHOD THEREOF

(71) Applicant: Samsung Electronics Co., Ltd., Suwon-si (KR)

(72) Inventors: Jaesik Jung, Suwon-si (KR); Gisu Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 402 days.

(21) Appl. No.: 17/975,008

(22) Filed: Oct. 27, 2022

(65) Prior Publication Data

US 2023/0122246 A1 Apr. 20, 2023

Related U.S. Application Data

(63) Continuation of application No. PCT/KR2022/015828, filed on Oct. 18, 2022.

(30) Foreign Application Priority Data

Oct. 18, 2021 (KR) ........................ 10-2021-0138831

(51) Int. Cl.
*H04W 76/10* (2018.01)
*H04W 52/02* (2009.01)

(52) U.S. Cl.
CPC ....... *H04W 76/10* (2018.02); *H04W 52/0209* (2013.01)

(58) Field of Classification Search
None
See application file for complete search history.

(56) References Cited

U.S. PATENT DOCUMENTS 8,484,494 B2 7/2013 Siegel et al.
10,895,863 B2 1/2021 Kim et al.
(Continued)

FOREIGN PATENT DOCUMENTS

CN 105744023 A 7/2016
EP 2712156 B1 12/2018
(Continued)

OTHER PUBLICATIONS

Extended European Search Report dated Dec. 3, 2024, issued in European Application No. 22883957.7-1218.
(Continued)

*Primary Examiner* — Gregory B Sefcheck
*Assistant Examiner* — Benjamin Peter Welte
(74) *Attorney, Agent, or Firm* — Jefferson IP Law, LLP

(57) ABSTRACT

An electronic device is provided. The electronic device includes a communication circuit for transmitting or receiving data through short-range wireless communication with an external electronic device, a memory for storing classification information for classifying at least one of a function executed by the electronic device or a control scenario including at least one operation performed by the electronic device as a connection state changes between the external electronic device and the electronic device, and a processor operatively connected to the communication circuit and the memory, and the processor may be configured to connect to the external electronic device by using the short-range wireless communication, identify the connection state with the external electronic device, identify classification information of at least one of a first function being executed by the electronic device or the external electronic device based on the connection state, and execute the control scenario based on the identified classification information.

14 Claims, 9 Drawing Sheets

(56) References Cited

U.S. PATENT DOCUMENTS

| | | | | |
|---|---|---|---|---|
| 11,119,626 | B1* | 9/2021 | Duneja | H04W 88/02 |
| 11,849,378 | B2 | 12/2023 | Mangalam Srivatsa et al. | |
| 2006/0187217 | A1 | 8/2006 | Son et al. | |
| 2009/0165063 | A1* | 6/2009 | Chow | H04N 21/44213 |
| 2011/0169654 | A1* | 7/2011 | Ketari | H04W 76/19 |
| | | | | 340/687 |
| 2014/0237221 | A1 | 8/2014 | Choi et al. | |
| 2015/0358778 | A1 | 12/2015 | Heo et al. | |
| 2016/0104006 | A1 | 4/2016 | Son et al. | |
| 2017/0285788 | A1 | 10/2017 | Park et al. | |
| 2018/0054414 | A1* | 2/2018 | LeVasseur | G06F 21/60 |
| 2018/0113586 | A1 | 4/2018 | Arar et al. | |
| 2018/0308425 | A1* | 10/2018 | Zhou | G09G 2330/021 |
| 2018/0335920 | A1* | 11/2018 | Tyler | H04W 4/80 |
| 2019/0006891 | A1 | 1/2019 | Park et al. | |
| 2019/0250678 | A1 | 8/2019 | Kim et al. | |
| 2019/0361694 | A1* | 11/2019 | Gordon | H04W 8/40 |
| 2020/0066236 | A1* | 2/2020 | Giusti | G06F 3/011 |
| 2020/0145920 | A1* | 5/2020 | Shen | G06F 21/36 |
| 2020/0204384 | A1* | 6/2020 | Esbensen | H04W 4/80 |
| 2022/0201113 | A1* | 6/2022 | Peng | H04W 76/10 |
| 2022/0216737 | A1 | 7/2022 | Park | |
| 2022/0408268 | A1* | 12/2022 | Johnston | H04M 1/72454 |
| 2023/0394951 | A1* | 12/2023 | Jeong | H04W 4/80 |

FOREIGN PATENT DOCUMENTS

| | | | |
|---|---|---|---|
| KR | 10-2006-0091552 A | 8/2006 |
| KR | 10-2014-0102902 A | 8/2014 |
| KR | 10-1469084 B1 | 12/2014 |
| KR | 10-2017-0097290 A | 8/2017 |
| KR | 10-2019-0003194 A | 1/2019 |
| KR | 10-2019-0098602 A | 8/2019 |
| KR | 10-2239090 B1 | 4/2021 |
| KR | 10-2258052 B1 | 5/2021 |
| WO | 2020/226384 A1 | 11/2020 |

OTHER PUBLICATIONS

Indian Office Action dated Dec. 10, 2025, issued in an Indian Patent Application No. 202417027074.

International Search Report dated Jan. 26, 2023, issued in International Patent Application No. PCT /KR2022/015828.

* cited by examiner

FIG. 9

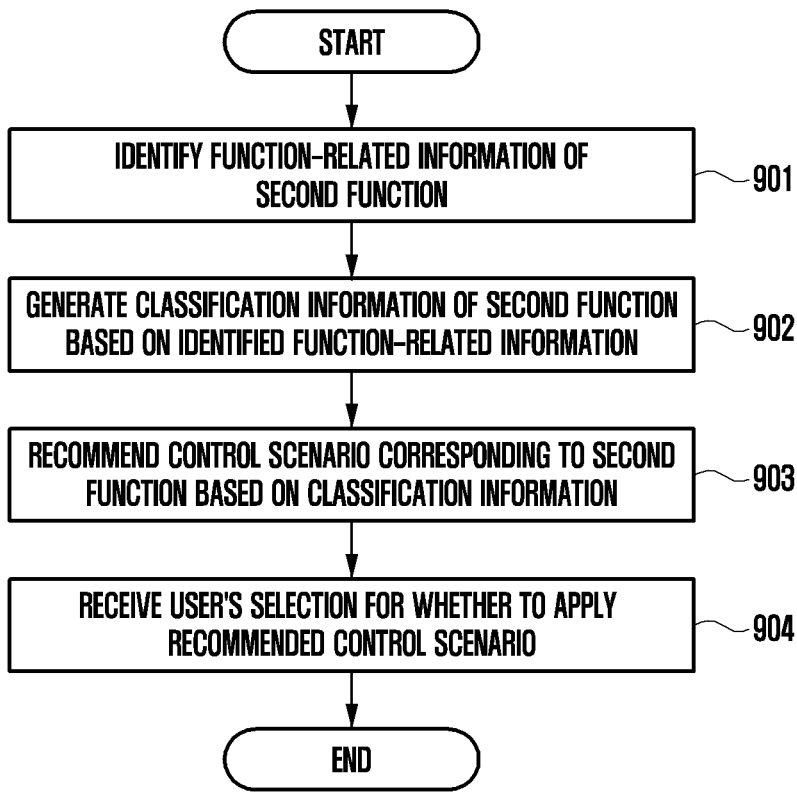

START

IDENTIFY FUNCTION-RELATED INFORMATION OF SECOND FUNCTION ~901

GENERATE CLASSIFICATION INFORMATION OF SECOND FUNCTION BASED ON IDENTIFIED FUNCTION-RELATED INFORMATION ~902

RECOMMEND CONTROL SCENARIO CORRESPONDING TO SECOND FUNCTION BASED ON CLASSIFICATION INFORMATION ~903

RECEIVE USER'S SELECTION FOR WHETHER TO APPLY RECOMMENDED CONTROL SCENARIO ~904

END

ELECTRONIC DEVICE COMMUNICATING WITH WEARABLE DEVICE AND CONTROLLING METHOD THEREOF

CROSS-REFERENCE TO RELATED APPLICATION(S)

This application is a continuation application, claiming priority under § 365(c), of an International application No. PCT/KR2022/015828, filed on Oct. 18, 2022, which is based on and claims the benefit of a Korean patent application number 10-2021-0138831, filed on Oct. 18, 2021, in the Korean Intellectual Property Office, the disclosure of which is incorporated by reference herein in its entirety.

TECHNICAL FIELD

The disclosure relates to an electronic device. More particularly, the disclosure relates to an electronic device configured to establish communication connection with a wearable device and a method for controlling the same.

BACKGROUND ART

Various wearable devices may be connected to portable wireless electronic devices (hereinafter, referred to as electronic devices), such as smartphones, by using wireless communication. Wearable electronic devices are provided in the following formats: sound devices epitomized by true wireless stereo (TWS) earphones, wristwatch-type wireless communication devices, and eyeglass-type wireless electronic devices.

A wearable device may be worn on and/or attached to a part of a user's body, and may communicate with an electronic device. The electronic device may transmit/receive signals and/or data with the wearable device. The electronic device may interwork by transmitting/receiving data and/or signals with the wearable device, thereby providing the user with a specific function or service.

The above information is presented as background information only to assist with an understanding of the disclosure. No determination has been made, and no assertion is made, as to whether any of the above might be applicable as prior art with regard to the disclosure.

DISCLOSURE

Technical Problem

When the user has inadvertently disconnected the wearable device and the electronic device, the electronic device may need to be controlled. For example, when the electronic device temporarily moves away from the electronic device, operations currently executed by the electronic device may continue. The electronic device cannot perform a process of activating a scenario desired by the user so as to protect the user's privacy, by replacing the current screen, or a process of maintaining the performance of the electronic device, for example. In such a case, personal privacy information may be leaked in the user's absent, or excessive screen maintenance may cause burn-in and power consumption.

Aspects of the disclosure are to address at least the above-mentioned problems and/or disadvantages and to provide at least the advantages described below. Accordingly, an aspect of the disclosure is to provide an electronic device communicating with a wearable device and a controlling method thereof.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a communication circuit for transmitting or receiving data through short-range wireless communication with an external electronic device, a memory for storing classification information for classifying at least one of a function executed by the electronic device or a control scenario including at least one operation performed by the electronic device as a connection state changes between the external electronic device and the electronic device, and a processor operatively connected to the communication circuit and the memory, wherein the processor is configured to connect to the external electronic device by using the short-range wireless communication, identify the connection state with the external electronic device, identify classification information of at least one of a first function being executed by the electronic device or the external electronic device based on the connection state, and execute the control scenario based on the identified classification information.

In accordance with another aspect of the disclosure, a method for an electronic device to execute a control scenario including at least one operation according to various embodiments disclosed herein is provided. The method includes connecting to an external electronic device by using a short-range wireless communication, identifying a connection state with the external electronic device, identifying classification information of at least one of a first function being executed by the electronic device or the external electronic device based on the connection state, and executing the control scenario including the at least one operation performed by the electronic device as the connection state changes between the external electronic device and the electronic device based on the identified classification information.

Advantageous Effects

According to various embodiments, an electronic device may enhance security regarding a user's personal information in connection with connecting the electronic device to a wearable device and then using the same, and may provide power saving and/or performance maintenance of the electronic device in connection with a control scenario. Therefore, the electronic device and a method for operating the electronic device may improve use convenience of the electronic device connected to the user's wearable device.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 9 is a flowchart illustrating an operation in which an electronic device executes a control scenario according to an embodiment of the disclosure.

Throughout the drawings, like reference numerals will be understood to refer to like parts, components, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
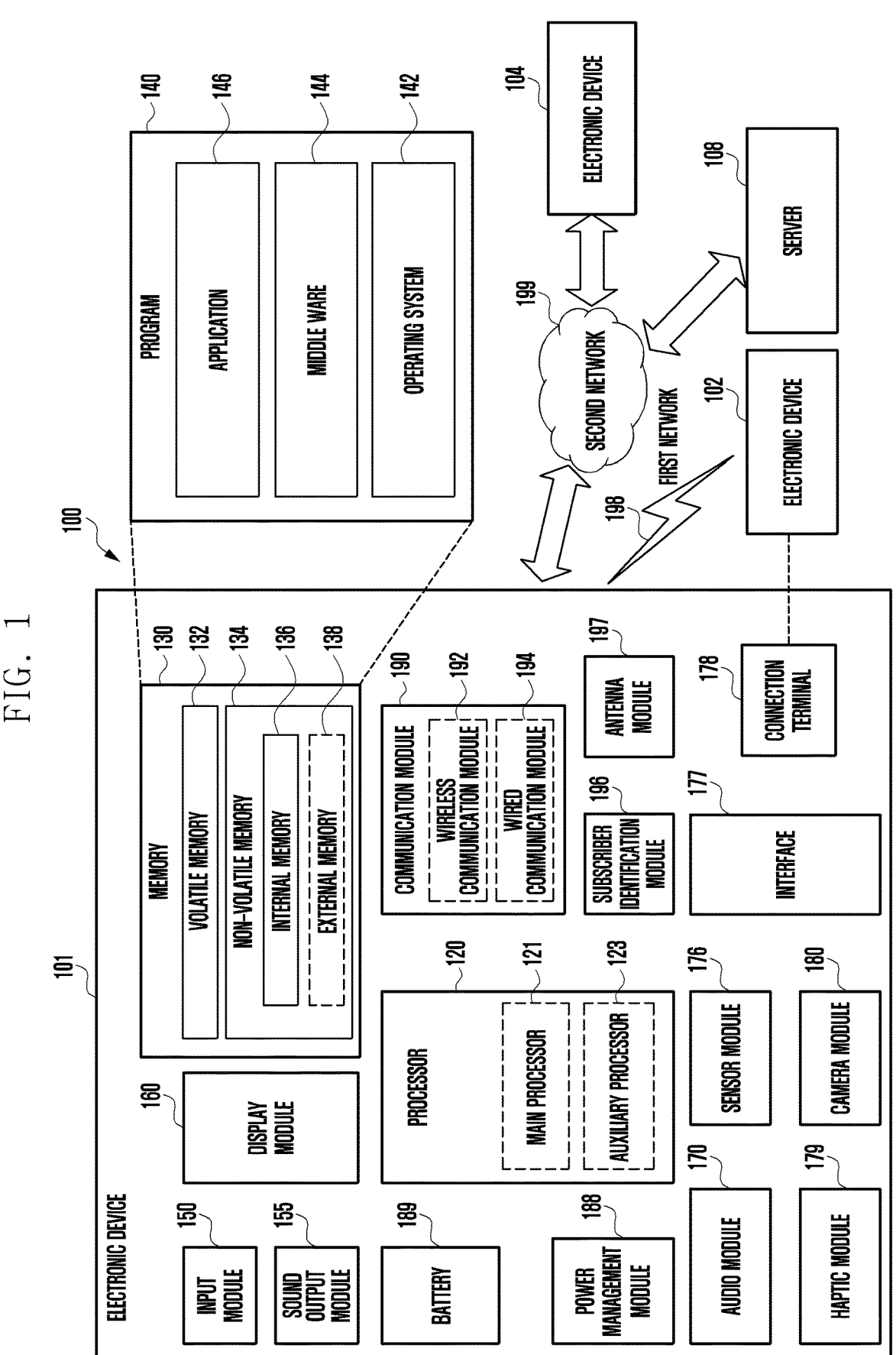
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a nonvolatile memory 134. According to another embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to yet another embodiment, the auxiliary processor 123 (e.g., an image signal processor or a communication processor) may be implemented as part of another component (e.g., the camera module 180 or the communication module 190) functionally related to the auxiliary processor 123. According to yet another embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to yet another embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the displays, hologram device, and projector. According to yet another embodiment, the display module 160 may include a touch sensor adapted to detect a touch, or a pressure sensor adapted to measure the intensity of force incurred by the touch.

The audio module 170 may convert a sound into an electrical signal and vice versa. According to yet another embodiment, the audio module 170 may obtain the sound via the input module 150, or output the sound via the sound output module 155 or a headphone of an external electronic device (e.g., an external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to yet another embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to yet another embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to yet another embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to yet another embodiment, the haptic module 179 may include, for example, a motor, a piezoelectric element, or an electric stimulator.

The camera module 180 may capture a still image or moving images. According to yet another embodiment, the camera module 180 may include one or more lenses, image sensors, image signal processors, or flashes.

The power management module 188 may manage power supplied to the electronic device 101. According to yet another embodiment, the power management module 188 may be implemented as at least part of, for example, a power management integrated circuit (PMIC).

The battery 189 may supply power to at least one component of the electronic device 101. According to yet another embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to yet another embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the sub-scriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communi-cation module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the external electronic device 104), or a network system (e.g., the second network 199). According to yet another embodiment, the wireless communication module 192 may support a peak data rate (e.g., 20 gigabytes per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to yet another embodiment, the antenna module 197 may include an antenna including a radiating element composed of a conductive material or a conductive pattern formed in or on a substrate (e.g., a printed circuit board (PCB)). According to yet another embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to yet another embodiment, another component (e.g., a radio frequency integrated circuit (RFIC)) other than the radiating element may be additionally formed as part of the antenna module 197.

According to various embodiments, the antenna module 197 may form a mmWave antenna module. According to yet another embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to yet another embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to yet another embodiment, all or some of operations to be executed at the electronic device 101 may be executed at one or more of the external electronic devices 102 or 104, or the server 108. For example, if the electronic device 101 should perform a function or a service automati-cally, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may pro-vide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodi-ment, the external electronic device 104 may include an internet-of-things (IoT) device. The server 108 may be an intelligent server using machine learning and/or a neural network. According to an embodiment, the external elec-tronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2:
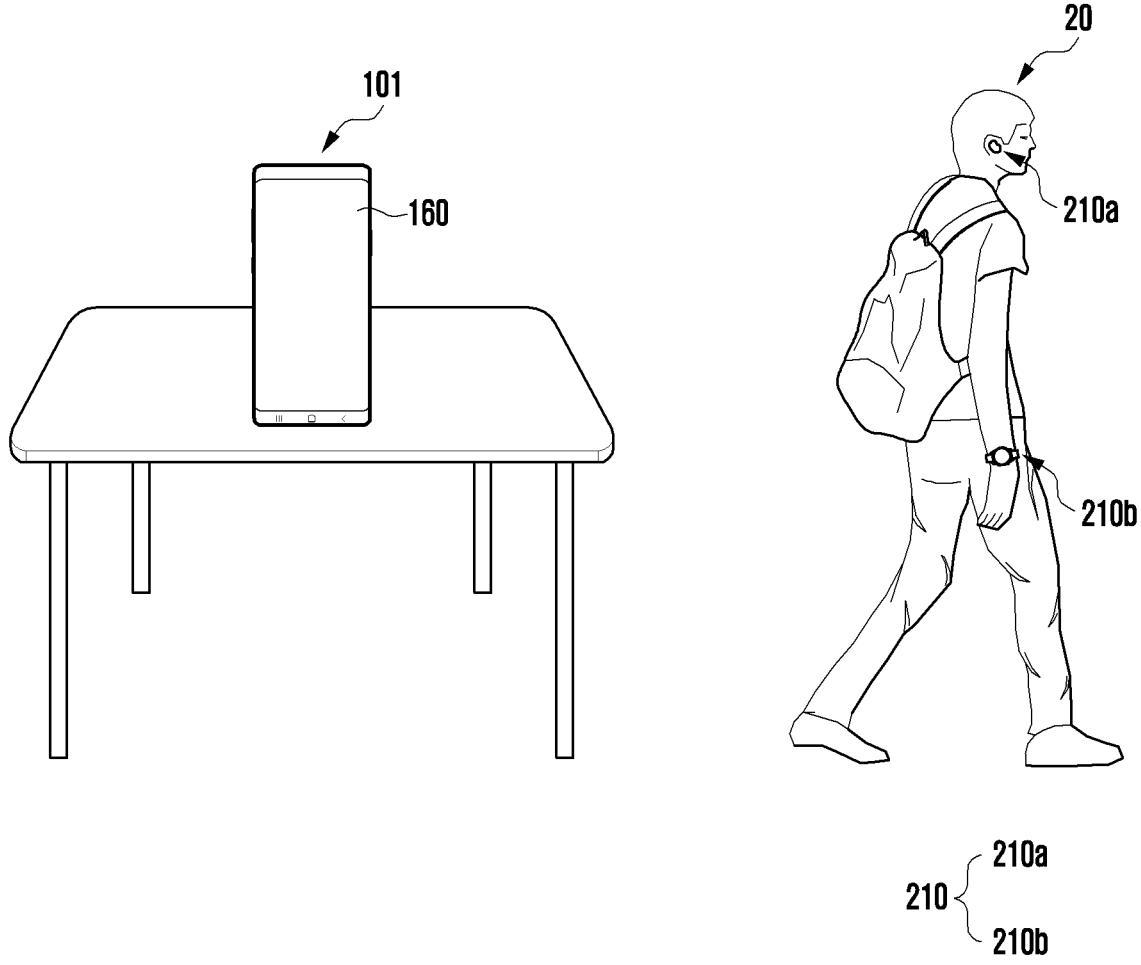
FIG. 2 illustrates an operation of an electronic device according to an embodiment of the disclosure.

FIG. 2 illustrates an operation of an electronic device according to an embodiment of the disclosure.

Referring to FIG. 2, the electronic device 101 may be connected to a wearable device 210 through wireless com-munication. Wireless communication may refer to various types of wireless communication including short-range wireless communication and/or cellular communication. According to various embodiments, the electronic device 101 may configure a connection with the wearable device 210 by using short-range wireless communication (e.g., the first network 198 of FIG. 1). The electronic device 101 and the wearable device 210 may be connected to each other by using short-range wireless communication such as, for example, wireless fidelity (WiFi), Bluetooth, or Bluetooth Low Energy (BLE). According to an embodiment, the electronic device 101 may transmit/receive (or exchange) data and/or signals with the wearable device 210.

According to various embodiments, the wearable device 210 may be attached to or worn on a part of the body of a user 20. According to another embodiment, the wearable device 210 may include a wireless earphone 210a (true wireless stereo (TWS)) or a watch 210b. Although the form and/or the function provided by the wearable device 210 is not limited, the disclosure will be described based on the wearable device 210 in the form of the wireless earphone 210a and/or the watch 210b for convenience.

According to various embodiments, the electronic device 101 may execute one or more functions. One or more functions executed by the electronic device 101 may include execution of an application installed on the electronic device 101. The electronic device 101 may store one or more applications in a memory (e.g., the memory 130 of FIG. 1), and the application may include instructions for allowing the processor (e.g., the processor 120 of FIG. 1) of the electronic device 101 to execute at least one function. According to another embodiment, the electronic device 101 may execute one or more functions in a state of communication connection with the wearable device 210.

According to various embodiments, the electronic device 101 may identify a connection state with the wearable device 210. According to yet another embodiment, in a case where the wireless communication connection between the electronic device 101 and the wearable device 210 is released, the electronic device 101 may identify whether the communication connection is released. According to an embodiment, the electronic device 101 may identify the connection state with the wearable device 210 based on the TCP/IP data transmission/reception state. According to yet another embodiment, the electronic device 101 may identify the connection state with the wearable device 210 based on whether the network socket connection is released in the application being used. According to yet another embodiment, the electronic device 101 may identify the connection state between the electronic device 101 and the wearable device 210 based on the strength (e.g., received signal strength indicator (RSSI)) of a signal received from the wearable device 210. According to yet another embodiment, the electronic device 101 may identify the connection state between the electronic device 101 and the wearable device 210 based on a connection release signal (e.g., connection release notification and/or information on the connection state with the electronic device 101 received from the application of the wearable device) received from the wearable device 210. According to yet another embodiment, the electronic device 101 may receive the connection release signal from the wearable device 210 and transmit a predetermined signal to the wearable device 210 so that the wearable device 210 outputs a signal (e.g., screen lock request, application termination request) requesting the user to select a control scenario. The signal requesting the user to select the control scenario may include a visual signal that may be displayed by using the display of the electronic device 101 and/or a voice signal that may be output by using the speaker of the electronic device 101. According to yet another embodiment, the electronic device 101 may identify the connection state and identify whether the connection with the wearable device 201 is released based on the confirmed connection state. For example, the electronic device 101 may determine that the connection with the wearable device 210 is released in response to a condition in which the strength of the received signal satisfies a specified condition (e.g., a condition that the strength of the received signal is not more than (or less than) the threshold value).

According to various embodiments, the electronic device 101 may identify the function being executed based on the connection state. According to yet another embodiment, in a case where the connection with the wearable device 210 is released, the electronic device 101 may identify the function of the electronic device 101 being executed at the time of connection release. According to an embodiment, in a case where the strength of the signal received from the wearable device 210 is less than the threshold value, the electronic device 101 may identify the function of the electronic device 101 being executed. According to yet another embodiment, the electronic device 101 may identify the type of the function being executed. For example, the electronic device 101 may identify the type of the application being executed.

According to various embodiments, the electronic device 101 may execute the control scenario based on the identified function. The control scenario may include at least one operation performed by the electronic device 101 when the connection with the wearable device 210 is released or when the connection signal strength is less than the threshold value. For example, as the control scenario, the electronic device 101 may execute an operation including at least one of an operation of terminating a function being executed, a screen lock operation, a screen saver operation, and a power saving operation. According to yet another embodiment, the screen saver operation may include an operation of displaying a predetermined image and/or a moving image until an additional input is received from the user. According to yet another embodiment, the power saving operation may refer to various operations for reducing power consumption of various components (e.g., a communication module (the communication module 190 of FIG. 1) and the processor 120) included in the electronic device 101. The power saving operation may include at least one of an operation of switching the communication module 190 to a sleep state, an operation of adjusting brightness and/or resolution of the display module 160 of the electronic device 101, and an operation of adjusting data throughput (e.g., the operation of adjusting the clock speed of the processor 120). The electronic device 101 may identify classification information of the identified function and execute the control scenario based on the classification information. The classification information may include information in which the function being executed by the electronic device 101 is classified according to a reference. The classification information may include information on a category to which a function being executed by the electronic device 101 belongs. The function being executed by the electronic device 101 may correspond to any one of a plurality of categories based on the type of the corresponding function, characteristics, and the type of the operation included. For example, the electronic device 101 may store and/or identify, as classification information of a certain function (e.g., the first function), information on whether the function corresponds to a function included in the first category related to security. For another example, the electronic device 101 may store and/or identify, as classification information of a certain function (e.g., the first function), information on whether the function corresponds to a function included in the second category related to power saving. The function belonging to the first category may include, for example, applications that provide security-critical financial functions, and the function belonging to the second category may include, for example, a game application and/or a media application that is an application that consumes a lot of power. According to yet another embodiment, the electronic device 101 may store and/or identify, as classification information of the first function, for example, data on whether the first function corresponds to a third category including general applications such as a message application and a call application.

According to various embodiments, the electronic device 101 may execute the control scenario based on the identified function. According to yet another embodiment, in a case where the connection with the wearable device 210 is released or the connection signal strength is less than the threshold value, the electronic device 101 may execute the control scenario in response to a function being executed as the foreground in the electronic device 101. The function being executed as the foreground may refer to a function being displayed to a user among a plurality of functions (e.g., applications) simultaneously executed by the electronic device 101. According to yet another embodiment, in a case where the connection with the wearable device 210 is released, if the function being executed as the foreground corresponds to the specified first application (e.g., security applications and financial applications), the electronic device 101 may perform at least a part of an operation of terminating a function being executed, a screen lock operation, and a screen saver operation as the control scenario. According to yet another embodiment, in a case where the connection with the wearable device 210 is released, if the function being executed as the foreground corresponds to the specified second application (e.g., a game application and a media playback application), the electronic device 101 may perform at least a part of an operation of terminating the function being executed and the power saving operation as the control scenario. According to yet another embodiment, in a case where the connection with the wearable device 210 is released, if the function being executed as the foreground corresponds to the specified third application (e.g., a call application and a message application), the electronic device 101 may perform at least a part of an operation of terminating the function being executed, the screen lock operation, the screen saver operation, and the power saving operation as the control scenario. The electronic device 101 may execute an operation including at least one of an operation of terminating the function being executed, the screen lock operation, the screen saver operation, and the power saving operation as the control scenario. According to yet another embodiment, the screen saver operation may include an operation of displaying a predetermined image and/or a moving image until an additional input is received from the user. According to yet another embodiment, the power saving operation may refer to various operations for reducing power consumption of various components (e.g., the communication module (the communication module 190 of FIG. 1) and the processor 120) included in the electronic device 101. The power saving operation may include at least one of an operation of switching the communication module 190 to a sleep state, an operation of adjusting brightness and/or resolution of the display module 160 of the electronic device 101, and an operation of adjusting data throughput (e.g., the operation of adjusting the clock speed of the processor 120).

According to various embodiments, the electronic device 101 may configure the control scenario. According to yet another embodiment, the electronic device 101 may configure the control scenario corresponding to a function (e.g., a second function) executed by the electronic device 101.

According to various embodiments, the electronic device 101 may generate classification information on the second function. According to yet another embodiment, the electronic device 101 may identify function-related information of the second function. The function-related information may be information including at least one of a request authority of the second function, a keyword preset in the second function, and a classification tag related to the second function. The electronic device 101 may identify function-related information of the second function and generate classification information of the second function according to whether the second function belongs to the first category or the second category based on the function-related information.

According to various embodiments, the electronic device 101 may generate the control scenario corresponding to the second function based on the classification information. According to yet another embodiment, the electronic device 101 may generate the control scenario for performing an operation including at least one of an operation of terminating a function being executed, a screen lock operation, a screen saver operation, and a power saving operation based on the connection state with the wearable device 210 and classification information of the second function. According to yet another embodiment, the control scenario configured by the electronic device 101 may include information on which operation the electronic device 101 will perform in response to the second function.

According to various embodiments, the electronic device 101 may receive an input for selecting whether to apply the generated control scenario from the user 20. The electronic device 101 may apply the control scenario generated based on an input related to the user's selection.

According to various embodiments, the electronic device 101 may receive the user input for selecting an operation included in the control scenario in response to the second function. For example, the electronic device 101 may display an input window in which the user 20 may select an operation to be included in the control scenario.

According to various embodiments, the wearable device 210 may transmit predetermined data to a communication-connected external electronic device (e.g., the electronic device 101). According to yet another embodiment, the wearable device 210 may transmit information on the connection state to the external electronic device. The information on the connection state may include notification information that the release of the wireless communication connection between the wearable device 210 and the external electronic device is imminent. According to yet another embodiment, the wearable device 210 may identify the connection state between the wearable device 210 and the external electronic device based on the strength (e.g., received signal strength indicator (RSSI)) of a signal received from the external electronic device through a wireless communication. According to an embodiment, the wearable device 210 may identify a distance to a connected external electronic device. According to yet another embodiment, the wearable device 210 may transmit information on the connection state to the external electronic device based on at least a part of the strength of a signal received from the external electronic device and/or the distance to the external electronic device. For example, in a case where the strength of the signal received from the external electronic device is less than the specified threshold value, the wearable device 210 may transmit information on the connection state to the external electronic device. For another example, in a case where the distance to the external electronic device becomes greater than the specified threshold value, the wearable device 210 may transmit information on the connection state to the external electronic device. According to yet another embodiment, the wearable device 210 may display information on the wireless communication connection state with the external electronic device (e.g., the electronic device 101) and/or information on the distance to the external electronic device. According to an embodiment, the wearable device 210 may include a display, and may visually display information on the connection state and/or information on the distance to the external electronic device through the display. According to a yet another n embodiment, the wearable device 210 may include an audio output module (e.g., a speaker) and output information on the connection state and/or information on the distance to the external electronic device through a voice signal.

Figure 3:
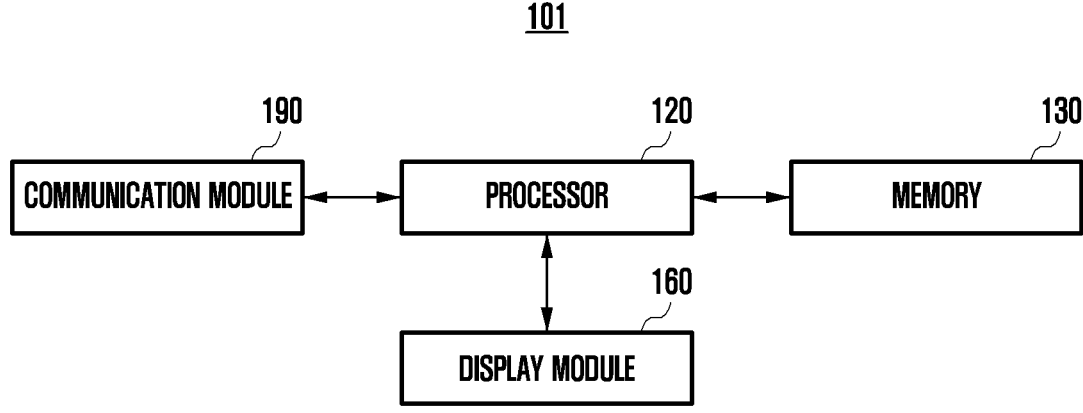
FIG. 3 is a block diagram of an electronic device according to an embodiment of the disclosure.

FIG. 3 is a block diagram of an electronic device according to an embodiment of the disclosure.

Referring to FIG. 3, the electronic device 101 (e.g., the electronic device 101 of FIG. 1 and/or the electronic device 101 of FIG. 2) may include a communication module 190, a memory 130, a display module 160, and/or a processor 120.

According to various embodiments, the memory 130 is for temporarily or permanently storing digital data and may include at least a part of the configuration and/or functions of the memory 130 of FIG. 1. In addition, the memory 130 may store at least a part of the program 140 of FIG. 1. The memory 130 may store various instructions that may be executed by the processor (e.g., the processor 120 of FIG. 3). Such instructions may include control commands such as logical operations and data input/output that may be recognized and executed by the processor 120. There is no limit to the type and/or amount of data that the memory 130 may store, but in the disclosure, only the configuration and function (e.g., the first function and/or the second function) of the memory related to the operation of the processor 120 that executes the function of the electronic device 101 or the function included in the control scenario according to various embodiments will be described.

The display module 160 may display information to the outside of the electronic device 101. The display module 160 may include at least a part of the configuration and/or functions of the display module 160 of FIG. 1. According to various embodiments, the display module 160 may visually display information received from the processor 120.

According to various embodiments, the communication module 190 may communicate with an external electronic device (e.g., the wearable device 210 of FIG. 1) by using wireless network communication (e.g., the first network 198 of FIG. 1). The wireless network communication may be performed by using a short-range communication network. There is no limit to the short-range wireless communication supported by the communication module 190, and for example, various communication schemes such as Wi-Fi, Bluetooth, and BLE may be supported. According to various embodiments, the communication module 190 may receive various data from the wearable device 210 of FIG. 2.

According to various embodiments, the processor 120 may process operations or data related to control and/or communication of each component of the electronic device 101. The processor 120 may include at least a part of the configuration and/or functions of the processor 120 of FIG. 1. The processor may be operatively, electrically, and/or functionally connected to components of the electronic device 101 such as the communication module 190, the display module 160, and/or the memory 130. There is no limit to the types and/or amounts of operations, calculations, and data processing that the processor 120 may perform, but in the disclosure, only the configuration and function of the processor 120 related to the method of executing the control scenario according to various embodiments and the operation of performing the method will be described.

According to various embodiments, the processor 120 may identify the connection state with the wearable device 210. According to an embodiment, the processor 120 may identify the connection state based on the strength (e.g., received signal strength indicator (RSSI)) of a signal received from the wearable device 210.

According to various embodiments, the processor 120 may identify whether the connection is released. According to another embodiment, the processor 120 may identify the connection state and may identify whether the connection with the wearable device 201 is released based on the confirmed connection state. For example, in a case where the strength of the received signal is less than the threshold value, the processor 120 may determine that the connection with the wearable device 210 is released.

According to various embodiments, the processor 120 may identify the function being executed based on the connection state. According to yet another embodiment, in a case where the connection with the wearable device 210 is released, the processor 120 may identify the function of the electronic device 101 being executed at the time of connection release. According to yet another embodiment, in a case where the strength of the signal received from the wearable device 210 is less than the threshold value, the processor 120 may identify the function of the electronic device 101 being executed. According to yet another embodiment, in a case where the connection with the wearable device 210 is released, the processor 120 may identify the function of the wearable device 210 being executed at the time of connection release. According to yet another embodiment, in a case where the strength of the signal received from the wearable device 210 is less than the threshold value, the processor 120 may identify the function of the wearable device 210 being executed. According to yet another embodiment, the processor 120 may identify the type of the function being executed. For example, the electronic device 101 may identify the type of the application being executed.

According to various embodiments, the processor 120 may execute the control scenario based on the identified function. The control scenario may include at least one operation performed by the electronic device 101 when the connection between the electronic device 101 and the wearable device 210 is released or when the connection signal strength is less than the threshold value. For example, the processor 120 may execute an operation including at least one of an operation of terminating the function being executed, the screen lock operation, the screen saver operation, and the power saving operation as the control scenario. According to yet another embodiment, the screen saver operation may include an operation of displaying a predetermined image and/or a moving image until an additional input is received from the user. According to yet another embodiment, the power saving operation may refer to various operations for reducing power consumption of various components (e.g., the communication module (the communication module 190 of FIG. 1) and the processor 120) included in the electronic device 101. The power saving operation may include at least one of an operation of switching the communication module 190 to a sleep state, an operation of adjusting brightness and/or resolution of the display module 160 of the electronic device 101, and an operation of adjusting data throughput (e.g., the operation of adjusting the clock speed of the processor 120).

According to various embodiments, the processor 120 may identify classification information of the identified function. The classification information may include information in which the function being executed by the electronic device 101 is classified according to a reference. The classification information may include information on a category to which a function being executed by the electronic device 101 belongs. The function being executed by the electronic device 101 may correspond to any one of a plurality of categories based on the type of the corresponding function, characteristics, and the type of the operation included. For example, the processor 120 may include, as classification information of a certain function (e.g., the first function), information on whether the function corresponds to a function included in the first category related to security. For another example, the processor 120 may include, as classification information of a certain function (e.g., the first function), information on whether the function corresponds to a function included in the second category related to power saving. The function belonging to the first category may include, for example, applications that provide security-critical financial functions, and the function belonging to the second category may include a game application that is an application that consumes a lot of power.

According to various embodiments, the processor 120 may identify the control scenario based on the classification information. According to yet another embodiment, the control scenario may include at least one operation that the electronic device 101 may perform, corresponding to the first function and/or classification information. For example, the processor 120 may execute an operation including at least one of an operation of terminating the first function, a screen lock operation, a screen saver operation, and a power saving operation in response to a function (e.g., the first function) being executed as the control scenario. According to yet another embodiment, in a case where the first function corresponds to a function included in the first category related to security, at least one of an operation of terminating the first function, a screen lock operation, and a screen saver operation may be included in the control scenario for user security. According to yet another embodiment, in a case where the classification information of a certain function (e.g., the first function) corresponds to the second category related to power saving, the processor 120 may include any one of an operation of terminating the first function, a screen lock operation, and a power saving operation in the control scenario. Each operation of the control scenario corresponding to the classification information may be previously stored in a memory (e.g., the memory 130 of FIG. 1). According to yet another embodiment, the processor 120 may identify the control scenario corresponding to the classification information based on the classification information.

According to yet another embodiment, the processor 120 may execute the identified control scenario. For example, at least one operation included in the identified control scenario may be executed.

According to yet another embodiment, the processor 120 may display a guide message. The processor 120 may display a screen for selecting at least one operation included in the identified control scenario by using the display module 160. According to yet another embodiment, the processor 120 may receive an input regarding whether to execute the control scenario from the user through the selection screen.

According to yet another embodiment, the processor 120 may identify function-related information of a function (e.g., the second function) of the electronic device 101. The function-related information may be information including at least one of a request authority of the second function, a keyword preset in the second function, and a classification tag related to the second function. According to yet another embodiment, the function-related information may be data previously stored in the memory 130 in response to the second function. According to yet another embodiment, in a case where the second function includes a third-party application service provided by a third party, function-related information corresponding to the second function may be stored in the memory 130 together with the application related to the second function.

According to yet another embodiment, the processor 120 may generate classification information on the second function. The processor 120 may identify function-related information of the second function and generate classification information of the second function according to whether the second function belongs to the first category or the second category based on the function-related information. For example, in a case where the function-related information of the second function includes a classification tag related to the game with respect to the second function, the processor 120 may classify the second function as the second category. According to yet another embodiment, the processor 120 may receive an input for classifying the second function from a user who classifies the second function (e.g., the user 20 of FIG. 2). In this case, the processor 120 may generate classification information of the second function based on the user input.

According to yet another embodiment, the processor 120 may configure the control scenario. According to yet another embodiment, the processor 120 may configure the control scenario corresponding to a function (e.g., the second function) executed by the electronic device 101. The processor 120 may generate the control scenario corresponding to the classification information.

According to various embodiments, the processor 120 may generate the control scenario corresponding to the second function based on the classification information. According to yet another embodiment, the processor 120 may generate the control scenario for performing an operation including at least one of an operation of terminating a function being executed, a screen lock operation, a screen saver operation, and a power saving operation based on the connection state with the wearable device 210 and classification information of the second function. According to yet another embodiment, the control scenario configured by the electronic device 101 may include information on which operation the electronic device 101 will perform in response to the second function.

According to various embodiments, the processor 120 may receive an input for selecting whether to apply the generated control scenario from the user 20. The processor 120 may apply the control scenario generated based on an input related to the user's selection. According to various embodiments, the processor 120 may receive the user input for selecting an operation included in the control scenario in response to the second function. For example, the processor 120 may display an input window in which the user 20 may select an operation to be included in the control scenario.

Figure 4:
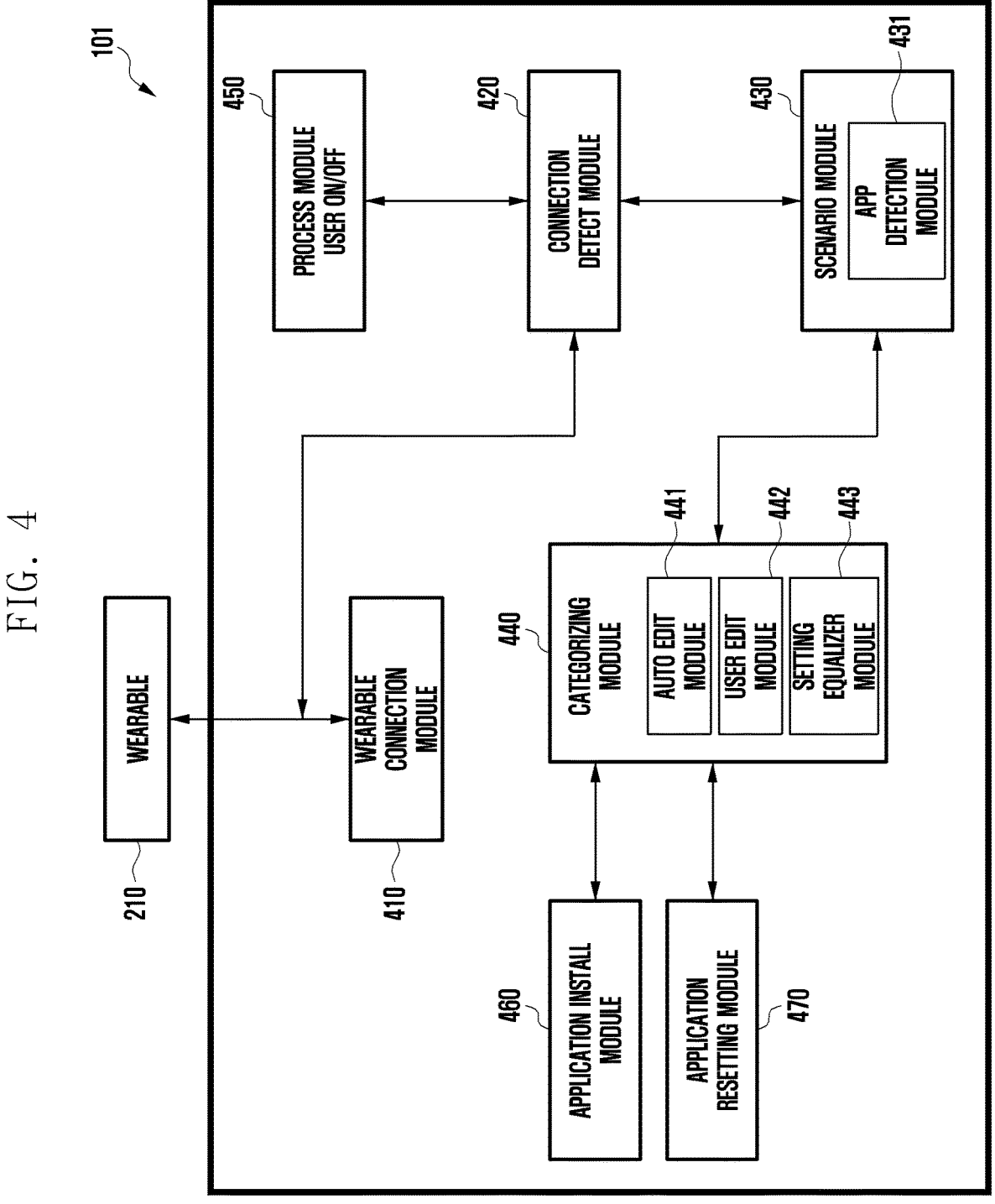
FIG. 4 is a block diagram illustrating a functional module of an electronic device according to an embodiment of the disclosure.

FIG. 4 is a block diagram illustrating a functional module of an electronic device according to an embodiment of the disclosure.

Referring to FIG. 4, the electronic device 101 (e.g., the electronic device 101 of FIG. 1 and/or the electronic device 101 of FIG. 2) may include a wearable connection module 410, a connection detect module 420, a scenario module 430, a categorizing module 440, a process module 450, an application install module 460, and/or an application resetting module 470. At least one module of the wearable connection module 410, the connection detect module 420, the scenario module 430, the categorizing module 440, the process module 450, the application install module 460, and/or the application resetting module 470 may be implemented on the processor (e.g., the processor 120 of FIG. 3) of the electronic device 101 in hardware and/or software.

According to various embodiments, the wearable connection module 410 may provide a communication connection between the wearable device 210 and the electronic device 101, transmit data and/or signals to the wearable device 210, and receive data and/or signals from the wearable device 210.

According to various embodiments, the connection detect module 420 may identify a connection state between the electronic device 101 and the wearable device 210. According to an embodiment, the connection detect module 420 may identify the connection state based on the strength (e.g., received signal strength indicator (RSSI)) of the signal received from the wearable device 210. According to another embodiment, the connection detect module 420 may identify the connection state and may identify whether the connection with the wearable device 201 is released based on the confirmed connection state. For example, in a case where the strength of the received signal is less than the threshold value, the connection detect module 420 may determine that the connection with the wearable device 210 is released.

According to various embodiments, the scenario module 430 may execute a control scenario. According to various embodiments, the scenario module 430 may identify the function being executed based on the connection state. According to yet another embodiment, the scenario module 430 may include an application detection module 431 and may identify classification information of a function being executed through the application detection module 431. According to yet another embodiment, in a case where the connection with the wearable device 210 is released, the application detection module 431 may identify the function of the electronic device 101 being executed at the time of the connection release. According to yet another embodiment, in a case where the strength of the signal received from the wearable device 210 is less than the threshold value, the application detection module 431 may identify the function of the electronic device 101 being executed. According to yet another embodiment, in a case where the connection with the wearable device 210 is released, the application detection module 431 may identify the function of the wearable device 210 being executed at the time of the connection release. According to yet another embodiment, in a case where the strength of the signal received from the wearable device 210 is less than the threshold value, the application detection module 431 may identify the function of the wearable device 210 being executed. According to yet another embodiment, the type of the function being executed by the application detection module 431 may be identified. For example, the electronic device 101 may identify the type of application being executed.

According to various embodiments, the scenario module 430 may execute the control scenario based on the identified function. The control scenario may include at least one operation performed by the electronic device 101 when the connection between the electronic device 101 and the wearable device 210 is released or when the connection signal strength is less than the threshold value. For example, the scenario module 430 may execute an operation including at least one of an operation of terminating the function being executed, the screen lock operation, the screen saver operation, and the power saving operation as the control scenario. According to yet another embodiment, the screen saver operation may include an operation of displaying a predetermined image and/or a moving image until an additional input is received from the user. According to yet another embodiment, the power saving operation may refer to various operations for reducing power consumption of various components (e.g., the communication module (the communication module 190 of FIG. 1) and the processor 120) included in the electronic device 101. The power saving operation may include at least one of an operation of switching the communication module 190 to a sleep state, an operation of adjusting brightness and/or resolution of the display module 160 of the electronic device 101, and an operation of adjusting data throughput (e.g., the operation of adjusting the clock speed of the processor 120). The scenario module 430 may identify classification information of the identified function and execute the control scenario based on the classification information. The classification information may include information in which the function being executed by the electronic device 101 is classified according to a reference. The classification information may include information on a category to which a function being executed by the electronic device 101 belongs. The function being executed by the electronic device 101 may correspond to any one of a plurality of categories based on the type of the corresponding function, characteristics, and the type of the operation included. For example, the scenario module 430 may include, as classification information of a certain function (e.g., the first function), information on whether the function corresponds to a function included in the first category related to security. For another example, the scenario module 430 may include, as classification information of a certain function (e.g., the first function), information on whether the function corresponds to a function included in the second category related to power saving. The function belonging to the first category may include, for example, applications that provide security-critical financial functions, and the function belonging to the second category may include a game application that is an application that consumes a lot of power.

According to various embodiments, the categorizing module 440 may generate classification information regarding a function (e.g., a second function) of the electronic device 101. The categorizing module 440 may identify function-related information of the second function and generate classification information of the second function according to whether the second function belongs to the first category or the second category based on the function-related information. For example, in a case where the function-related information of the second function includes a classification tag related to the game with respect to the second function, the classification module 440 may classify the second function as the second category. According to yet another embodiment, the categorizing module 440 may receive an input for classifying the second function from a user who classifies the second function (e.g., the user 20 of FIG. 2). In this case, the classification module 440 may generate classification information of the second function based on the user input.

According to various embodiments, the categorizing module 440 may configure a control scenario. According to yet another embodiment, the categorizing module 440 may configure the control scenario corresponding to a function (e.g., the second function) executed by the electronic device 101 by using an automatic edit module 441. The categorizing module 440 may generate the control scenario corresponding to the classification information.

According to various embodiments, the automatic edit module 441 may generate a control scenario corresponding to the second function based on the classification information. According to yet another embodiment, the categorizing module 440 may generate the control scenario for performing an operation including at least one of an operation of terminating a function being executed, a screen lock operation, a screen saver operation, and a power saving operation based on the connection state with the wearable device 210 and classification information of the second function. According to yet another embodiment, the control scenario configured by the electronic device 101 may include information on which operation the electronic device 101 will perform in response to the second function.

According to yet another embodiment, a user edit module 442 may receive an input for classifying the second function from a user who classifies the second function (e.g., the user 20 of FIG. 2). In this case, the user edit module 442 may generate classification information of the second function based on the user input.

According to yet another embodiment, a setting equalizer module 443 may receive a user input for selecting an operation included in the control scenario in response to the second function. For example, the setting equalizer module 443 may display an input window in which the user 20 may select an operation to be included in the control scenario.

According to yet another embodiment, the application install module 460 may install a new function (e.g., the second function) executable by the electronic device 101. The application install module 460 may install the second function in the electronic device 101 by using data received from the external electronic device (e.g., the server 104 of FIG. 1), and may transmit function-related information of the second function to the classification module 440.

According to yet another embodiment, the application resetting module 470 may configure a control scenario for a function in which the control scenario configuration is not stored among functions previously installed in the electronic device 101, and/or reconfigures the control scenario for the function of the electronic device 101. For example, the application resetting module 470 may receive an input for configuring or changing the control scenario from a user (e.g., the user of FIG. 2) and transmit the user input to the classification module 440.

According to yet another embodiment, the process module 450 may receive a user's selection regarding whether to apply the control scenario.

Figure 5:
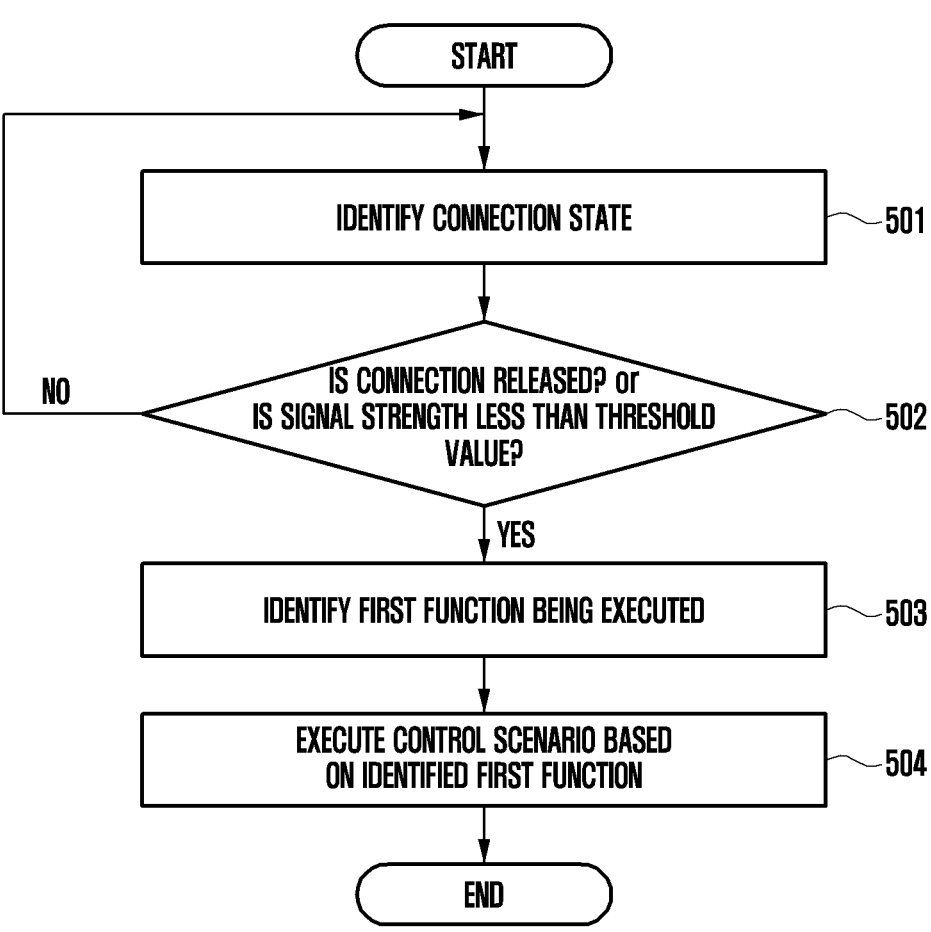
FIG. 5 is a flowchart illustrating an operation in which an electronic device executes a control scenario according to an embodiment of the disclosure.

FIG. 5 is a flowchart illustrating an operation in which an electronic device executes a control scenario according to an embodiment of the disclosure.

Referring to FIG. 5, an operation in which the electronic device 101 (e.g., the electronic device 101 of FIG. 1, the electronic device 101 of FIG. 2, and/or the electronic device 101 of FIG. 3) executes the control scenario may be described as each operation performed by the processor (e.g., the processor 120 of FIG. 1 and/or the processor 120 of FIG. 3) of the electronic device 101. In each operation of FIG. 5, an order and/or a part of the operation may be changed, replaced, and/or added.

Referring to operation 501, the processor 120 may identify the connection state with the wearable device 210. According to an embodiment, the processor 120 may identify the connection state based on the strength (e.g., received signal strength indicator (RSSI) of the signal received from the wearable device 210.

Referring to operation 502, the processor 120 may identify whether the connection is released. According to another embodiment, the processor 120 may identify the connection state and may identify whether the connection with the wearable device 201 is released based on the confirmed connection state. For example, in a case where the strength of the received signal is less than the threshold value, the processor 120 may determine that the connection with the wearable device 210 is released.

Referring to operation 503, the processor 120 may identify a function being executed based on the connection state. According to yet another embodiment, in a case where the connection with the wearable device 210 is released, the processor 120 may identify the function of the electronic device 101 being executed at the time of connection release. According to yet another embodiment, in a case where the strength of the signal received from the wearable device 210 is less than the threshold value, the processor 120 may identify the function of the electronic device 101 being executed. According to yet another embodiment, in a case where the connection with the wearable device 210 is released, the processor 120 may identify the function of the wearable device 210 being executed at the time of connection release. According to yet another embodiment, in a case where the strength of the signal received from the wearable device 210 is less than the threshold value, the processor 120 may identify the function of the wearable device 210 being executed. According to yet another embodiment, the processor 120 may identify the type of the function being executed. For example, the electronic device 101 may identify the type of the application being executed.

Referring to operation 504, the processor 120 may execute the control scenario based on the identified function. The control scenario may include at least one operation performed by the electronic device 101 when the connection with the wearable device 210 is released or when the connection signal strength is less than the threshold value. For example, as a control scenario, the processor 120 may execute an operation including at least one of an operation of terminating a function being executed, a screen lock operation, a screen saver operation, and a power saving operation. According to yet another embodiment, the screen saver operation may include an operation of displaying a predetermined image and/or a moving image until an additional input is received from the user. According to yet another embodiment, the power saving operation may refer to various operations for reducing power consumption of various components (e.g., the communication module (the communication module 190 of FIG. 1) and the processor 120) included in the electronic device 101. The power saving operation may include at least one of an operation of switching the communication module 190 to a sleep state, an operation of adjusting brightness and/or resolution of the display module 160 of the electronic device 101, and an operation of adjusting data throughput (e.g., the operation of adjusting the clock speed of the processor 120).

Figure 6:
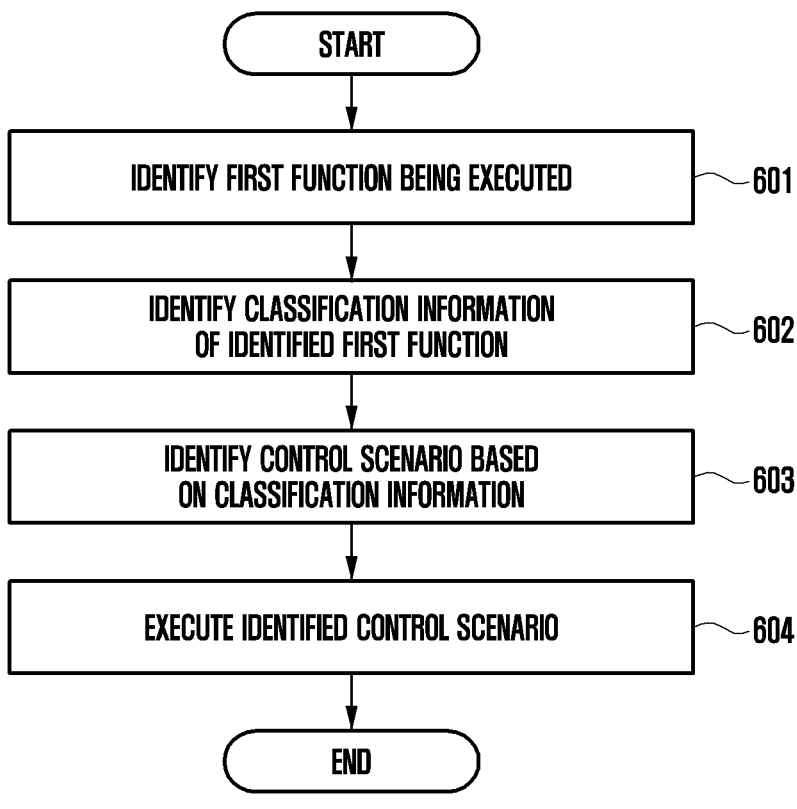
FIG. 6 is a flowchart illustrating an operation in which an electronic device executes a control scenario according to an embodiment of the disclosure.

FIG. 6 is a flowchart illustrating an operation in which an electronic device executes a control scenario according to an embodiment of the disclosure.

Referring to FIG. 6, an operation in which the electronic device 101 (e.g., the electronic device 101 of FIG. 1, the electronic device 101 of FIG. 2, and/or the electronic device 101 of FIG. 3) executes the control scenario may be described as each operation performed by the processor (e.g., the processor 120 of FIG. 1 and/or the processor 120 of FIG. 3) of the electronic device 101. In each operation of FIG. 6, an order and/or a part of the operation may be changed, replaced, and/or added.

Referring to operation 601, the processor 120 may identify a function being executed. According to an embodiment, in a case where the connection with the wearable device 210 is released, the processor 120 may identify the function of the electronic device 101 being executed at the time of connection release. According to another embodiment, in a case where the strength of the signal received from the wearable device 210 is less than the threshold value, the processor 120 may identify the function of the electronic device 101 being executed. According to yet another embodiment, in a case where the connection with the wearable device 210 is released, the processor 120 may identify the function of the wearable device 210 being executed at the time of connection release. According to yet another embodiment, in a case where the strength of the signal received from the wearable device 210 is less than the threshold value, the processor 120 may identify the function of the wearable device 210 being executed. According to yet another embodiment, the processor 120 may identify the type of the function being executed. For example, the electronic device 101 may identify the type of the application being executed.

Referring to operation 602, the processor 120 may identify classification information of the identified function. The classification information may include information in which the function being executed by the electronic device 101 is classified according to a reference. The classification information may include information on a category to which a function being executed by the electronic device 101 belongs. The function being executed by the electronic device 101 may correspond to any one of a plurality of categories based on the type of the corresponding function, characteristics, and the type of the operation included. For example, the processor 120 may include, as classification information of a certain function (e.g., the first function), information on whether the function corresponds to a function included in the first category related to security. For another example, the processor 120 may include, as classification information of a certain function (e.g., the first function), information on whether the function corresponds to a function included in the second category related to power saving. The function belonging to the first category may include, for example, applications that provide security-critical financial functions, and the function belonging to the second category may include a game application that is an application that consumes a lot of power.

Referring to operation 603, the processor 120 may identify the control scenario based on the classification information. According to yet another embodiment, the control scenario may include at least one operation that the electronic device 101 may perform corresponding to the first function and/or classification information. For example, the processor 120 may execute an operation including at least one of an operation of terminating the first function, a screen lock operation, a screen saver operation, and a power saving operation in response to a function (e.g., the first function) being executed as the control scenario. According to yet another embodiment, in a case where the first function corresponds to a function included in the first category related to security, at least one of an operation of terminating the first function, a screen lock operation, and a screen saver operation may be included in the control scenario for user security. According to yet another embodiment, in a case where the classification information of a certain function (e.g., the first function) corresponds to the second category related to power saving, the processor 120 may include any one of an operation of terminating the first function, a screen lock operation, and a power saving operation in the control scenario. Each operation of the control scenario corresponding to the classification information may be previously stored in a memory (e.g., the memory 130 of FIG. 1). According to yet another embodiment, the processor 120 may identify the control scenario corresponding to the classification information based on the classification information.

Referring to operation 604, the processor 120 may execute the identified control scenario. The control scenario may include at least one operation performed by the electronic device 101 when the connection between the electronic device 101 and the wearable device 210 is released or when the connection signal strength is less than the threshold value. For example, the processor 120 may execute an operation including at least one of an operation of terminating the function being executed, the screen lock operation, the screen saver operation, and the power saving operation as the control scenario. According to yet another embodiment, the screen saver operation may include an operation of displaying a predetermined image and/or a moving image until an additional input is received from the user. According to yet another embodiment, the power saving operation may refer to various operations for reducing power consumption of various components (e.g., the communication module (the communication module 190 of FIG. 1) and the processor 120) included in the electronic device 101. The power saving operation may include at least one of an operation of switching the communication module 190 to a sleep state, an operation of adjusting brightness and/or resolution of the display module 160 of the electronic device 101, and an operation of adjusting data throughput (e.g., the operation of adjusting the clock speed of the processor 120).

Figure 7:
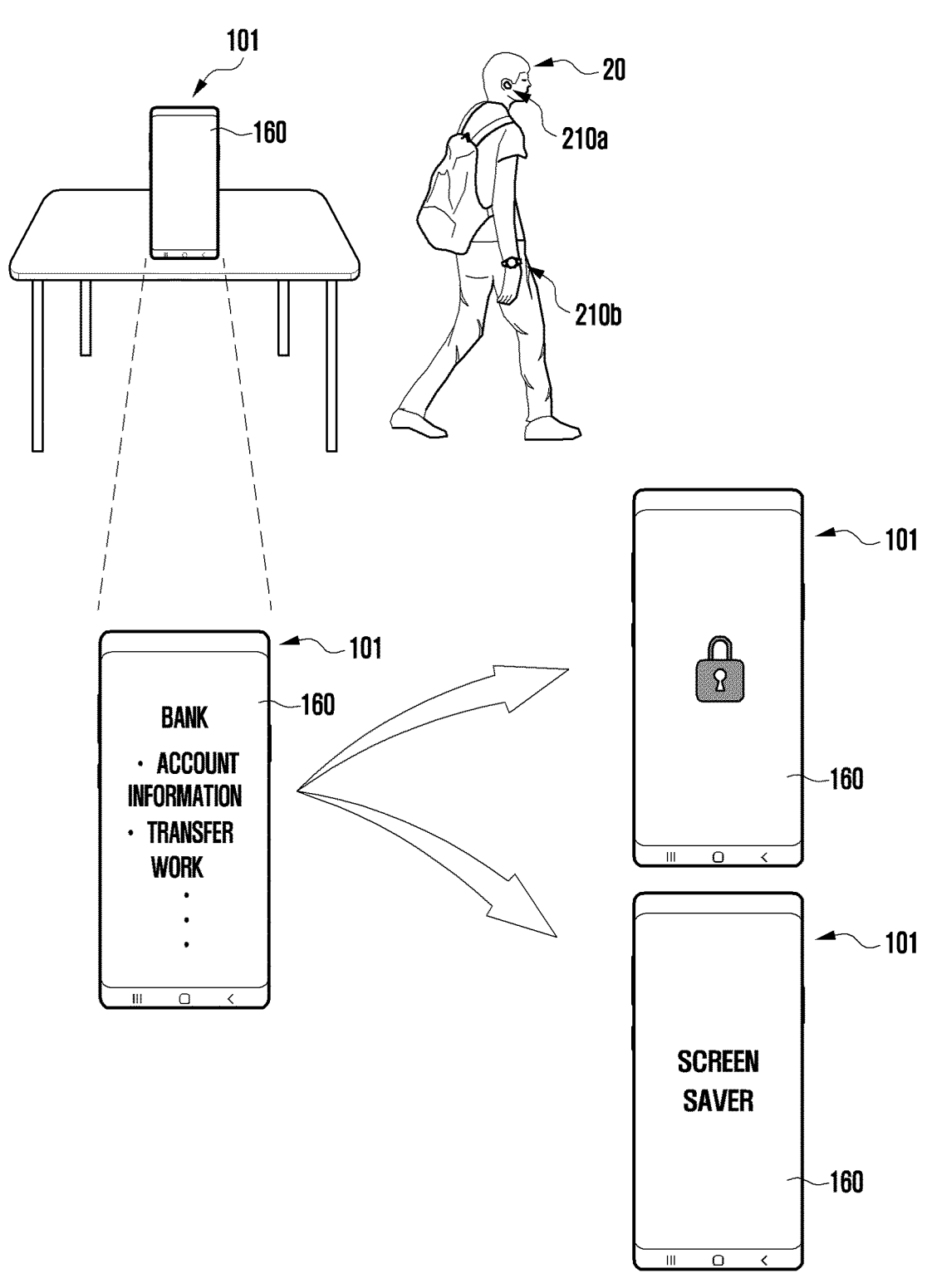
FIG. 7 illustrates that an electronic device executes a control scenario according to an embodiment of the disclosure.

FIG. 7 illustrates that an electronic device executes a control scenario according to an embodiment of the disclosure.

Referring to FIG. 7, the electronic device 101 (e.g., the electronic device 101 of FIG. 1, the electronic device 101 of FIG. 2, and/or the electronic device 101 of FIG. 3) may execute a control scenario.

Referring to FIG. 7, the user 20 may use the electronic device 101 to use a function (e.g., the first function) of the electronic device 101 and may move while leaving the electronic device 101 while executing the first function. In this case, the user 20 may be in a state in which the wearable device 210 is worn. The electronic device 101 may execute the control scenario when the user 20 moves away by a certain distance or more.

According to various embodiments, the electronic device 101 may identify a connection state with the wearable device 210. According to an embodiment, the electronic device 101 may identify the connection state based on the strength (e.g., received signal strength indicator (RSSI)) of a signal received from the wearable device 210. According to another embodiment, the electronic device 101 may identify the connection state and identify whether the connection with the wearable device 201 is released based on the confirmed connection state. For example, the electronic device 101 may determine that the connection with the wearable device 210 is released in response to a condition in which the strength of the received signal satisfies a specified condition (e.g., a condition that the strength of the received signal is not more than (or less than) the threshold value). The electronic device 101 may identify whether the user 20 is moving away based on the connection state with the wearable device 210.

According to various embodiments, the electronic device 101 may identify the function being executed based on the connection state. According to yet another embodiment, in a case where the connection with the wearable device 210 is released, the electronic device 101 may identify the function of the electronic device 101 being executed at the time of connection release. According to yet another embodiment, in a case where the strength of the signal received from the wearable device 210 is less than the threshold value, the electronic device 101 may identify the function of the electronic device 101 being executed. According to yet another embodiment, in a case where the connection with the wearable device 210 is released, the electronic device

101 may identify the function of the wearable device 210 being executed at the time of connection release. According to yet another embodiment, in a case where the strength of the signal received from the wearable device 210 is less than the threshold value, the electronic device 101 may identify the function of the wearable device 210 being executed. According to yet another embodiment, the electronic device 101 may identify the type of function being executed. For example, the electronic device 101 may identify the type of the application being executed. Referring to FIG. 7, the electronic device 101 may be executing an application related to banking.

According to various embodiments, the electronic device 101 may execute the control scenario based on the identified function. The control scenario may include at least one operation performed by the electronic device 101 when the connection with the wearable device 210 is released or when the connection signal strength is less than the threshold value. For example, as a control scenario, the electronic device 101 may execute an operation including at least one of an operation of terminating a function being executed, a screen lock operation, a screen saver operation, and a power saving operation. According to yet another embodiment, the screen saver operation may include an operation of displaying a predetermined image and/or a moving image until an additional input is received from the user. According to yet another embodiment, the power saving operation may refer to various operations for reducing power consumption of various components (e.g., the communication module (the communication module 190 of FIG. 1) and the processor 120) included in the electronic device 101. The power saving operation may include at least one of an operation of switching the communication module 190 to a sleep state, an operation of adjusting brightness and/or resolution of the display module 160 of the electronic device 101, and an operation of adjusting data throughput (e.g., the operation of adjusting the clock speed of the processor 120). The electronic device 101 may identify classification information of the identified function and execute the control scenario based on the classification information. The classification information may include information in which the function being executed by the electronic device 101 is classified according to a reference. The classification information may include information on a category to which a function being executed by the electronic device 101 belongs. The function being executed by the electronic device 101 may correspond to any one of a plurality of categories based on the type of the corresponding function, characteristics, and the type of the operation included. For example, the electronic device 101 may include, as classification information of a certain function (e.g., the first function), information on whether the function corresponds to a function included in the first category related to security. For another example, the electronic device 101 may include, as classification information of a certain function (e.g., the first function), information on whether the function corresponds to a function included in the second category related to power saving. The function belonging to the first category may include, for example, applications that provide security-critical financial functions, and the function belonging to the second category may include a game application that consumes a lot of power. Referring to FIG. 7, the electronic device 101 may be executing an application related to banking, which may be classified as a security-related function, for example, a function belonging to the first category. The control scenario may include at least one operation that the electronic device 101 may perform corresponding to the first function and/or classification information. For example, the processor 120 may execute an operation including at least one of an operation of terminating the first function, a screen lock operation, a screen saver operation, and a power saving operation in response to a function (e.g., the first function) being executed as the control scenario. According to yet another embodiment, in a case where the first function corresponds to a function included in the first category related to security, at least one of an operation of terminating the first function, a screen lock operation, and a screen saver operation may be included in the control scenario for user security. According to yet another embodiment, in a case where the classification information of a certain function (e.g., the first function) corresponds to the second category related to power saving, the processor 120 may include any one of an operation of terminating the first function, a screen lock operation, and a power saving operation in the control scenario. Each operation of the control scenario corresponding to the classification information may be previously stored in a memory (e.g., the memory 130 of FIG. 1). According to yet another embodiment, the processor 120 may identify the control scenario corresponding to the classification information based on the classification information. Referring to FIG. 7, the first function is an application related to banking, and the control scenario corresponding to the first function may include at least one of a screen lock operation and a screen saver operation.

According to yet another embodiment, the screen lock operation may include, for example, displaying a lock screen so that the electronic device 101 may not receive other operations until a preset unlock input such as a fingerprint input, a face recognition input, a password input, and a pattern input is received.

According to yet another embodiment, the screen saver operation may include an operation of displaying a predetermined image and/or a moving image until an additional input is received from the user.

Figure 8:
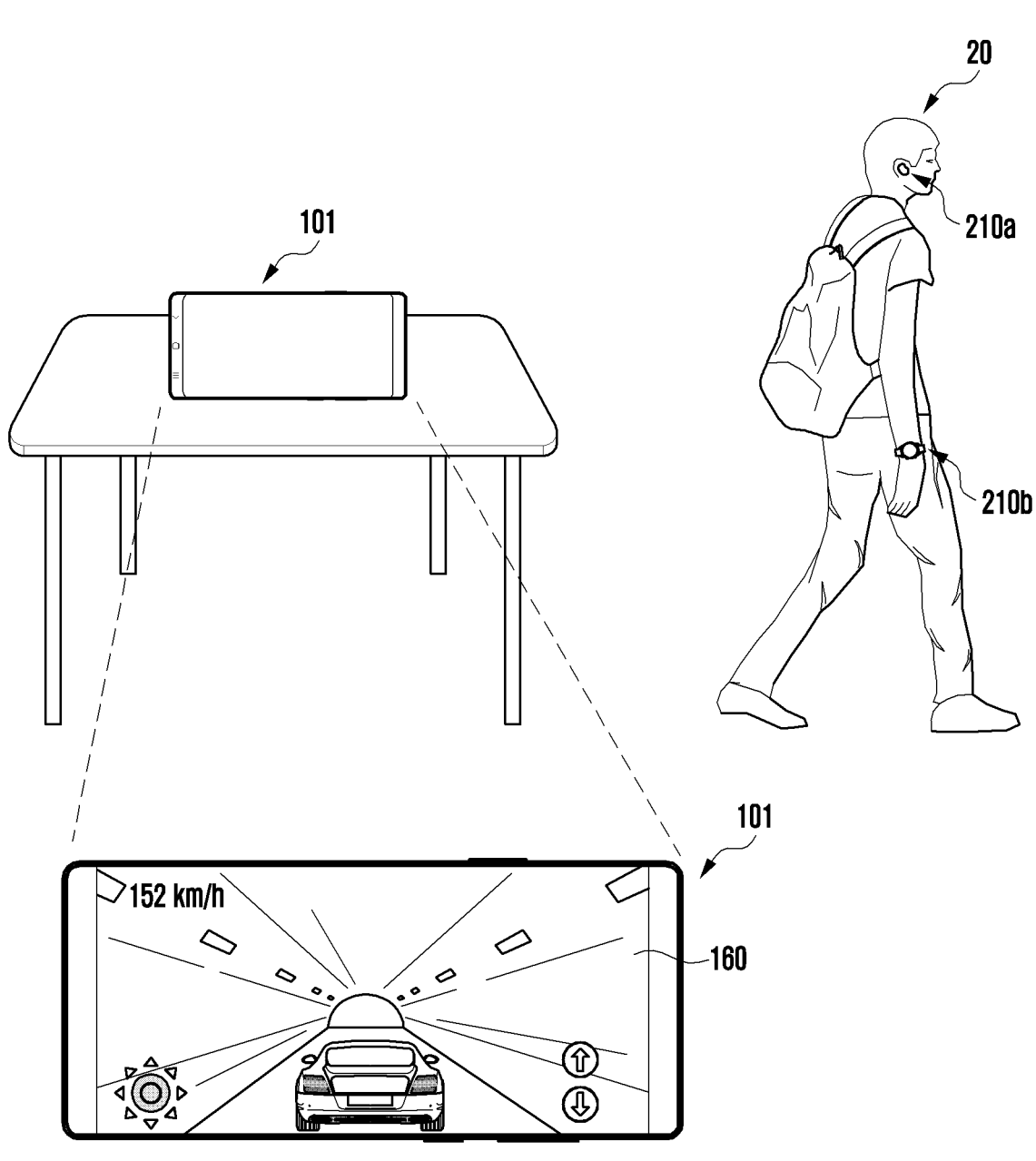
FIG. 8 illustrates that an electronic device executes a control scenario according to an embodiment of the disclosure.

FIG. 8 illustrates that an electronic device executes a control scenario according to an embodiment of the disclosure.

Referring to FIG. 8, the electronic device 101 (e.g., the electronic device 101 of FIG. 1, the electronic device 101 of FIG. 2, and/or the electronic device 101 of FIG. 3) may execute a control scenario.

Referring to FIG. 8, the user 20 may use the electronic device 101 to use a function (e.g., the first function) of the electronic device 101 and may move while leaving the electronic device 101 while executing the first function. In this case, the user 20 may be in a state in which the wearable device 210 is worn. The electronic device 101 may execute the control scenario when the user 20 moves away by a certain distance or more.

According to various embodiments, the electronic device 101 may identify a connection state with the wearable device 210. According to an embodiment, the electronic device 101 may identify the connection state based on the strength (e.g., received signal strength indicator (RSSI)) of a signal received from the wearable device 210. According to another embodiment, the electronic device 101 may identify the connection state and identify whether the connection with the wearable device 201 is released based on the confirmed connection state. For example, the electronic device 101 may determine that the connection with the wearable device 210 is released in response to a condition in which the strength of the received signal satisfies a specified condition (e.g., a condition that the strength of the received signal is not more than (or less than) the threshold value).

The electronic device 101 may identify whether the user 20 is moving away based on the connection state with the wearable device 210.

According to various embodiments, the electronic device 101 may identify the function being executed based on the connection state. According to yet another embodiment, in a case where the connection with the wearable device 210 is released, the electronic device 101 may identify the function of the electronic device 101 being executed at the time of connection release. According to yet another embodiment, in a case where the strength of the signal received from the wearable device 210 is less than the threshold value, the electronic device 101 may identify the function of the electronic device 101 being executed. According to yet another embodiment, in a case where the connection with the wearable device 210 is released, the electronic device 101 may identify the function of the wearable device 210 being executed at the time of connection release. According to yet another embodiment, in a case where the strength of the signal received from the wearable device 210 is less than the threshold value, the electronic device 101 may identify the function of the wearable device 210 being executed. According to yet another embodiment, the electronic device 101 may identify the type of function being executed. For example, the electronic device 101 may identify the type of the application being executed. Referring to FIG. 8, the electronic device 101 may be executing a game application.

According to various embodiments, the electronic device 101 may execute the control scenario based on the identified function. The control scenario may include at least one operation performed by the electronic device 101 when the connection with the wearable device 210 is released or when the connection signal strength is less than the threshold value. For example, as a control scenario, the electronic device 101 may execute an operation including at least one of an operation of terminating a function being executed, a screen lock operation, a screen saver operation, and a power saving operation. According to yet another embodiment, the screen saver operation may include an operation of displaying a predetermined image and/or a moving image until an additional input is received from the user. According to yet another embodiment, the power saving operation may refer to various operations for reducing power consumption of various components (e.g., the communication module (the communication module 190 of FIG. 1) and the processor 120) included in the electronic device 101. The power saving operation may include at least one of an operation of switching the communication module 190 to a sleep state, an operation of adjusting brightness and/or resolution of the display module 160 of the electronic device 101, and an operation of adjusting data throughput (e.g., the operation of adjusting the clock speed of the processor 120). The electronic device 101 may identify classification information of the identified function and execute the control scenario based on the classification information. The classification information may include information in which the function being executed by the electronic device 101 is classified according to a reference. The classification information may include information on a category to which a function being executed by the electronic device 101 belongs. The function being executed by the electronic device 101 may correspond to any one of a plurality of categories based on the type of the corresponding function, characteristics, and the type of the operation included. For example, the electronic device 101 may include, as classification information of a certain function (e.g., the first function), information on whether the function corresponds to a function included in the first category related to security. For another example, the electronic device 101 may include, as classification information of a certain function (e.g., the first function), information on whether the function corresponds to a function included in the second category related to power saving. The function belonging to the first category may include, for example, applications that provide security-critical financial functions, and the function belonging to the second category may include a game application that consumes a lot of power. Referring to FIG. 8, the electronic device 101 may be executing a game application (the first function), and in this case, the first function may be classified as a function with relatively high power consumption, for example, a function belonging to the second category requiring power saving. The control scenario may include at least one operation that the electronic device 101 may perform corresponding to the first function and/or classification information. For example, the processor 120 may execute an operation including at least one of an operation of terminating the first function, a screen lock operation, a screen saver operation, and a power saving operation in response to a function (e.g., the first function) being executed as the control scenario. According to yet another embodiment, in a case where the first function corresponds to a function included in the first category related to security, at least one of an operation of terminating the first function, a screen lock operation, and a screen saver operation may be included in the control scenario for user security. According to yet another embodiment, in a case where the classification information of a certain function (e.g., the first function) corresponds to the second category related to power saving, the processor 120 may include any one of an operation of terminating the first function, a screen lock operation, a screen saver operation, and a power saving operation in the control scenario. Each operation of the control scenario corresponding to the classification information may be previously stored in a memory (e.g., the memory 130 of FIG. 1). According to yet another embodiment, the processor 120 may identify the control scenario corresponding to the classification information based on the classification information. Referring to FIG. 8, the first function is a game application, and the control scenario corresponding to the first function may include at least one of an operation of terminating the first function, a screen lock operation, a screen saver operation, and a power saving operation.

According to yet another embodiment, the screen lock operation may include, for example, displaying a lock screen so that the electronic device 101 may not receive other operations until a preset unlock input such as a fingerprint input, a face recognition input, a password input, and a pattern input is received.

According to yet another embodiment, the screen saver operation may include an operation of displaying a predetermined image and/or a moving image until an additional input is received from the user.

According to yet another embodiment, the power saving operation may refer to various operations for reducing power consumption of various components (e.g., the communication module (the communication module 190 of FIG. 1) and the processor 120) included in the electronic device 101. The power saving operation may include at least one of an operation of switching the communication module 190 to a sleep state, an operation of adjusting brightness and/or resolution of the display module 160 of the electronic device 101, and an operation of adjusting data throughput (e.g., the operation of adjusting the clock speed of the processor 120).

FIG. 9 is a flowchart illustrating an operation in which an electronic device executes a control scenario according to an embodiment of the disclosure.

Referring to FIG. 9, an operation in which the electronic device 101 (e.g., the electronic device 101 of FIG. 1, the electronic device 101 of FIG. 2, and/or the electronic device 101 of FIG. 3) configures the control scenario may be described as each operation performed by the processor (e.g., the processor 120 of FIG. 1 and/or the processor 120 of FIG. 3) of the electronic device 101. In each operation of FIG. 9, an order and/or a part of the operation may be changed, replaced, and/or added.

Referring to operation 901, the processor 120 may identify function-related information of a function (e.g., the second function) of the electronic device 101. The function-related information may be information including at least one of a request authority of the second function, a keyword preset in the second function, and a classification tag related to the second function. According to an embodiment, the function-related information may be data previously stored in the memory 130 in response to the second function. According to another embodiment, in a case where the second function includes a third-party application service provided by a third party, function-related information corresponding to the second function may be stored in the memory 130 together with the application related to the second function.

Referring to operation 902, the processor 120 may generate classification information on the second function. The processor 120 may identify function-related information of the second function and generate classification information of the second function according to whether the second function belongs to the first category or the second category based on the function-related information. For example, in a case where the function-related information of the second function includes a classification tag related to the game with respect to the second function, the processor 120 may classify the second function as the second category. According to yet another embodiment, the processor 120 may receive an input for classifying the second function from a user who classifies the second function (e.g., the user 20 of FIG. 2). In this case, the processor 120 may generate classification information of the second function based on the user input.

Referring to operation 903, the processor 120 may recommend a control scenario corresponding to the second function based on the classification information. According to various embodiments, the processor 120 may configure the control scenario. According to yet another embodiment, the processor 120 may configure the control scenario corresponding to a function (e.g., the second function) executed by the electronic device 101. The processor 120 may generate the control scenario corresponding to the classification information. According to various embodiments, the processor 120 may generate the control scenario corresponding to the second function based on the classification information. According to yet another embodiment, the processor 120 may generate the control scenario for performing an operation including at least one of an operation of terminating a function being executed, a screen lock operation, a screen saver operation, and a power saving operation based on the connection state with the wearable device 210 and classification information of the second function. According to yet another embodiment, the control scenario configured by the electronic device 101 may include information on which operation the electronic device 101 will perform in response to the second function.

Referring to operation 904, according to yet another embodiment, the processor 120 may receive an input for selecting whether to apply the generated control scenario from the user 20. The processor 120 may apply the control scenario generated based on an input related to the user's selection. According to yet another embodiment, the processor 120 may receive the user input for selecting an operation included in the control scenario in response to the second function. For example, the processor 120 may display an input window in which the user 20 may select an operation to be included in the control scenario. The electronic device according to various embodiments of the disclosure may be configured to include a communication circuit for transmitting or receiving data through short-range wireless communication with an external electronic device, a memory for storing classification information for classifying at least one of a function executed by an electronic device or a control scenario including at least one operation performed by the electronic device as a connection state between the external electronic device and the electronic device changes, and a processor operatively connected to the communication circuit and the memory, and the processor may be configured to be connected to the external electronic device by using the short-range wireless communication, identify the connection state with the external electronic device, identify classification information of at least one of a first function being executed by the electronic device or the external electronic device based on the connection state, and execute the control scenario based on the identified classification information.

In addition, the processor may be configured to identify the connection state, and identify classification information of the first function being executed based on whether the connection is released.

In addition, the processor may be configured to identify the connection state based on the strength of a signal received through the short-range wireless communication.

In addition, the processor may be configured to identify a distance between the external electronic device and the electronic device based on the strength of a signal received through the short-range wireless communication and identify the connection state based on the distance.

In addition, a display module may be further included, and the control scenario may include at least one of an operation of terminating the first function being executed, a screen lock operation, a screen saver operation, or a power saving operation.

In addition, the processor may be configured to change at least one of a brightness of the display module, a resolution of the display module, or a data processing throughput when the power saving operation is executed.

In addition, the processor may be configured to visually display information on the first function being executed through the display module, display a predetermined video image through the display module when the screen saver operation is executed, and re-display information on the first function being executed when an input is received.

In addition, the processor may be configured to identify function-related information related to a second function of the electronic device, generate classification information on the second function based on the related information, and generate a control scenario corresponding to the second function based on the classification information.

In addition, the processor may be configured to receive a user input for whether to approve the generated control scenario, and store the control scenario in the memory based on the user input.

In addition, the function-related information may include at least one of a request authority of the second function, a keyword related to the second function, or a classification tag related to the second function.

In addition, the classification information may include information on whether the classification information belongs to any one of a first category requiring security for the first function or a second category requiring power saving.

In addition, the processor may be configured to execute at least one of an operation of terminating the first function, a screen lock operation, or a screen saver operation when the classification information of the first function is the first category.

In addition, the processor may be configured to execute at least one of an operation of terminating the first function, a screen lock operation, a screen saver operation, or a power saving operation when the classification information of the first function is the second category.

In addition, the processor may be configured to display a screen capable of receiving an input in which a user selects at least one of the operations included in the control scenario based on the connection state and execute at least one of the operations based on the input selected by the user.

In addition, the processor may be configured to transmit a signal for causing the external electronic device to output a screen capable of receiving the input to the external electronic device based on the connection state, and execute at least one of the operations based on a signal related to an input selected by the user received from the external electronic device.

A method for an electronic device according to various embodiments of the disclosure to execute a control scenario including at least one operation may include connecting to an external electronic device by using a short-range wireless communication, identifying a connection state with the external electronic device, identifying classification information of a first function being executed by the electronic device and/or the external electronic device based on the connection state, and executing the control scenario including at least one operation performed by the electronic device as the connection state between the external electronic device and the electronic device changes based on the identified classification information.

In addition, identifying the classification information may include identifying the connection state, and identifying classification information of the first function being executed based on whether the connection is released or a signal strength of the short-range wireless communication.

In addition, the control scenario may include at least one of an operation of terminating the first function being executed, a screen lock operation, a screen saver operation, or a power saving operation.

In addition, identifying function-related information related to a second function of the electronic device, generating classification information on the second function based on the related information, and generating a control scenario corresponding to the second function based on the classification information may be further included.

In addition, displaying a screen capable of receiving an input in which a user selects at least one of the operations included in the control scenario based on the connection state, and executing at least one of the operations based on the input selected by the user may be further included.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a communication circuit transmitting or receiving data through short-range wireless communication with an external electronic device;
memory storing:
instructions,
classification information of at least one application executed by the electronic device, and
at least one control scenario, corresponding to one or more applications among the at least one application, including at least one operation performed by the electronic device based on state of connection between the electronic device and the external electronic device; and
at least one processor operatively connected to the communication circuit and the memory,
wherein the instructions, when executed by the at least one processor individually or collectively, cause the electronic device to:
establish a connection between the electronic device and the external electronic device by using the short-range wireless communication,
identify a connection state of the established connection between the electronic device and the external electronic device,
identify classification information of a first application, of at least one of the electronic device or the external electronic device, executed by the electronic device, wherein the classification information indicates a category of the first application among at least a first category of application related to providing security regarding a user's information and a second category of application related to providing power saving regarding power consumption during application execution,
based on the identified connection state, execute, in a case that the classification information indicates the category of the first application as being the first category of application related to providing security regarding the user's information, the control scenario of a screen lock operation,
based on the identified connection state, execute, in a case that the classification information indicates the category of the first application as being the second category of application related to providing power saving regarding power consumption during application execution, the control scenario of terminating the first application being executed by the electronic device,
display a screen capable of receiving an input in which a user selects an operation from the at least one operation included in the control scenario, based on the identified connection state,
execute the operation selected based on the input,
transmit a signal for causing the external electronic device to output to a screen capable of receiving another input to the external electronic device, based on the identified connection state, and
execute one of the at least one operation based on a signal related to the another input received from the external electronic device.

2. The electronic device of claim 1, wherein the connection state is identified based on release of the connection being identified.

3. The electronic device of claim 1, wherein the connection state is identified based on a strength of a signal received through the short-range wireless communication being identified as less than a threshold value.

4. The electronic device of claim 1,
wherein the instructions, when executed by the at least one processor individually or collectively, further cause the electronic device to:
identify a distance between the electronic device and the external electronic device based on a strength of a signal received through the short-range wireless communication, and
wherein the connection state is identified based on the identified distance being greater than a threshold value.

5. The electronic device of claim 1, further comprising:
a display,
wherein the control scenario further comprises at least one of an operation of a screen saver operation, or a power saving operation.

6. The electronic device of claim 5, wherein the instructions, when executed by the at least one processor individually or collectively, further cause the electronic device to:
change at least one of a brightness of the display, a resolution of the display, or a data processing throughput when the power saving operation is executed.

7. The electronic device of claim 5, wherein the instructions, when executed by the at least one processor individually or collectively, further cause the electronic device to:
visually display information about the first application being executed by the electronic device through the display,
display a predetermined video image through the display when the screen saver operation is executed, and re-display information about the first application being executed by the electronic device when an input is received.

8. The electronic device of claim 1, wherein the instructions, when executed by the at least one processor individually or collectively, further cause the electronic device to:

identify function-related information related to a second application of the electronic device, generate classification information on the second application based on the identified function-related information, and generate a control scenario corresponding to the second application based on the generated classification information.

9. The electronic device of claim 8, wherein the instructions, when executed by the at least one processor individually or collectively, further cause the electronic device to:

receive a user input for whether to approve the generated control scenario, and store the generated control scenario in the memory based on the user input.

10. The electronic device of claim 8, wherein the function-related information comprises at least one of a request authority of the second application, a keyword related to the second application, or a classification tag related to the second application.

11. A method performed by an electronic device to execute a control scenario including at least one operation, the method comprising:

establishing a connection between the electronic device and an external electronic device by using a short-range wireless communication;

identifying a connection state of the established connection between the electronic device and the external electronic device;

identifying classification information of a first application, of at least one of the electronic device or the external electronic device, executed by the electronic device, wherein the classification information indicates a category of the first application among at least a first category of application related to providing security regarding a user's information and a second category of application related to providing power saving regarding power consumption during application execution, based on the identified connection state, executing, in a case that the classification information indicates the category of the first application as being the first category of application related to providing security regarding the user's information, the control scenario of a screen lock operation;

based on the identified connection state, executing, in a case that the classification information indicates the category of the first application as being the second category of application related to providing power saving regarding power consumption during application execution, the control scenario of terminating the first application being executed by the electronic device;

displaying a screen capable of receiving an input in which a user selects an operation from the at least one operation included in the control scenario, based on the identified connection state;

executing the operation selected based on the input;

transmitting a signal for causing the external electronic device to output to a screen capable of receiving another input to the external electronic device, based on the identified connection state; and executing one of the at least one operation based on a signal related to the another input received from the external electronic device.

12. The method of claim 11, wherein the connection state is identified based on one of release of the connection being identified or a strength of a signal received through the short-range wireless communication being identified as less than a threshold value.

13. The method of claim 11, wherein the control scenario comprises at least one of an operation of a screen saver operation, or a power saving operation.

14. The method of claim 11, further comprising:

identifying function-related information related to a second application of the electronic device;

generating classification information on the second application based on the identified function-related information; and generating a control scenario corresponding to the second application based on the generated classification information.

* * * * *